United States Patent Office 2,711,075
Patented June 21, 1955

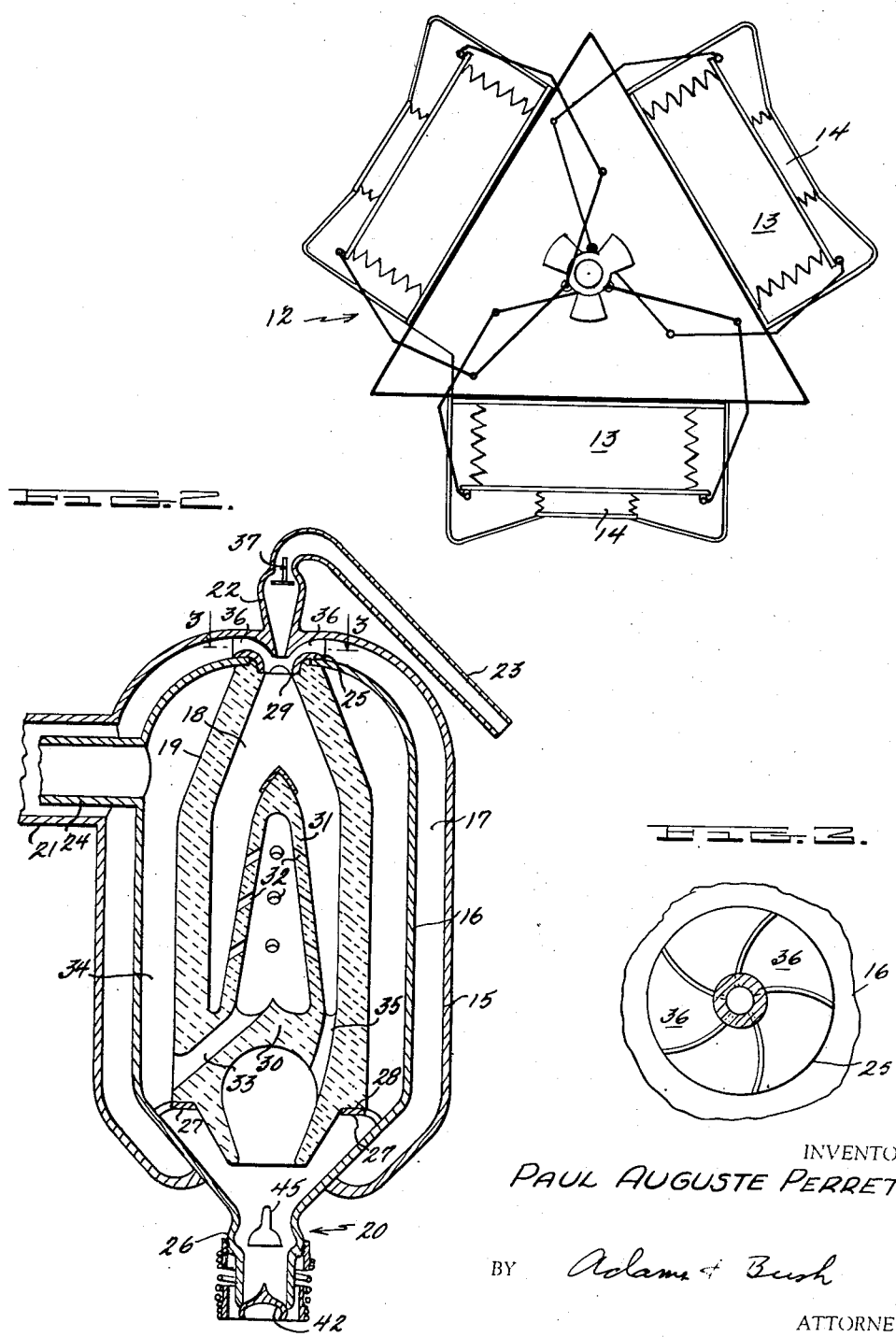

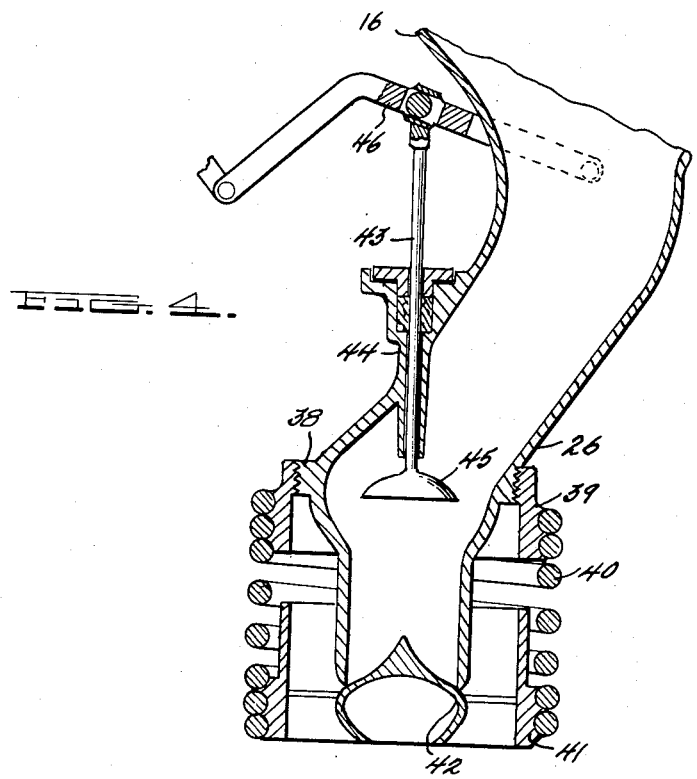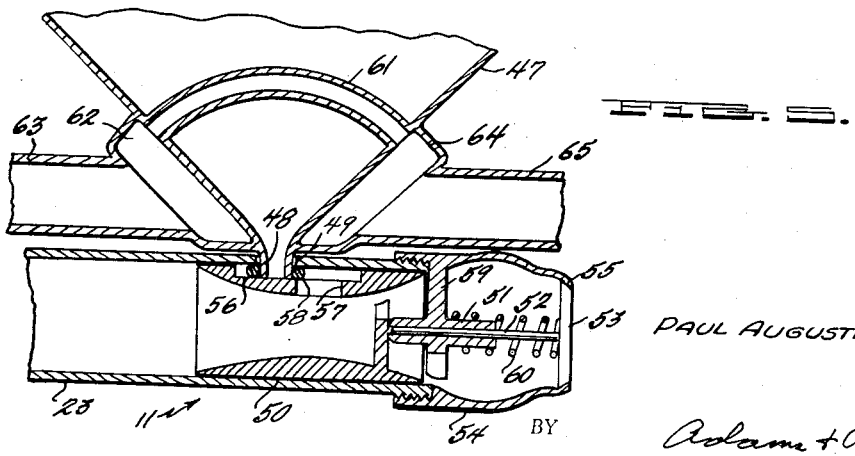

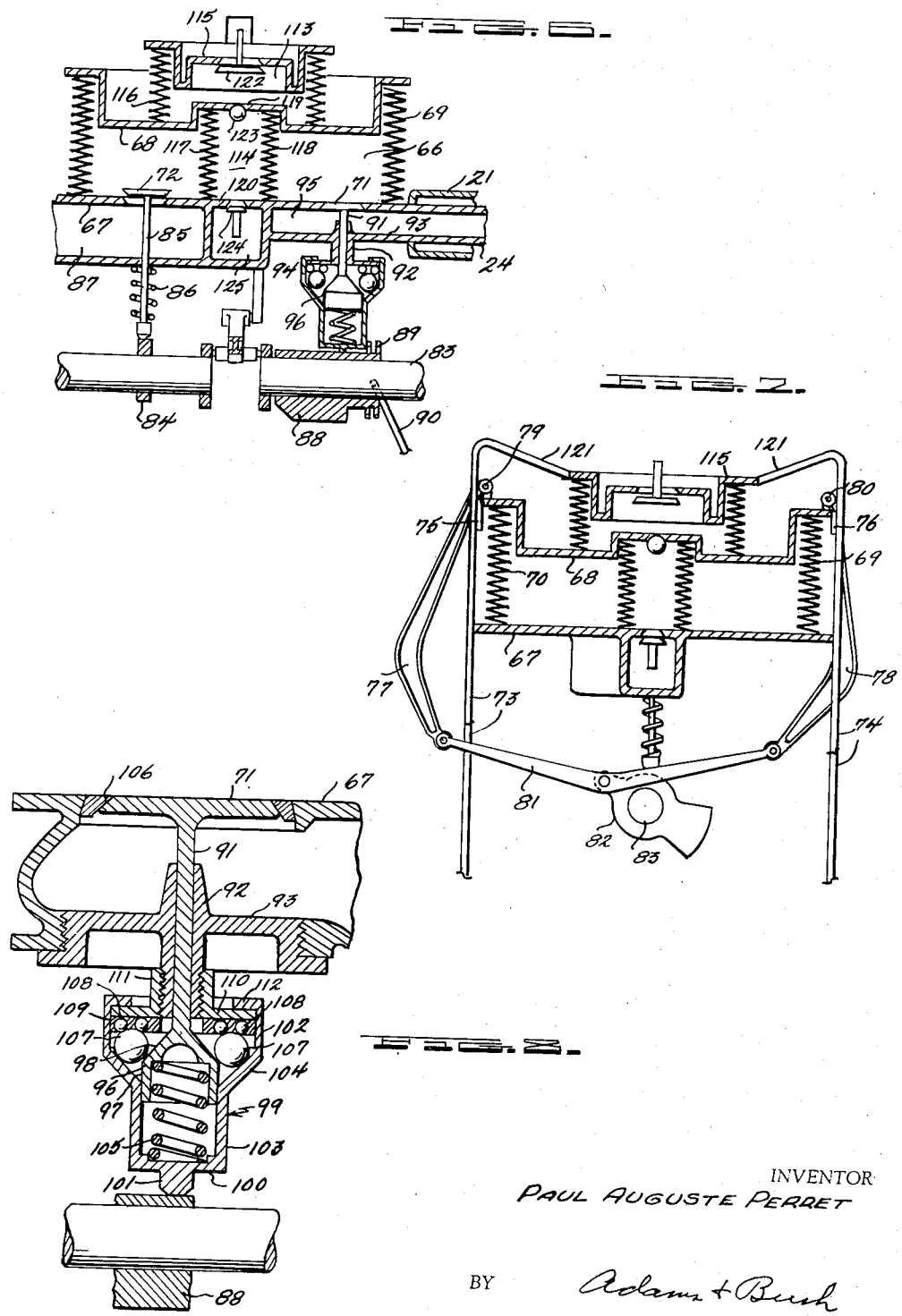

2,711,075

EXTERNAL COMBUSTION ENGINES WITH BELLOWS-TYPE EXPANSION CHAMBERS

Paul Auguste Perret, Tournus, France

Application January 10, 1951, Serial No. 205,273

Claims priority, application France January 16, 1950

8 Claims. (Cl. 60—39.63)

This invention relates to combustion engines and has more particular reference to external combustion engines.

One object of the present invention is to provide a novel and improved external combustion thermal engine based on the principal of a combustion under pressure, in a heat-proofed chamber, of an invariable capacity, and the utilization of the resulting gases in one or more bellows-type, expansion, driving chambers having a variable volume which transmits the expansion energy of the gases to a driving shaft.

Another object of the invention is to provide an external combustion engine, as characterized above, wherein the combustion chamber is adapted to burn powdered fuel and is provided with means for ejecting the ashes of combustion therefrom.

Another object of the invention is to provide an external combustion engine, as characterized above, in which the bellows chambers have fixed ends and movable ends, with the fixed ends having admission and exhaust valves operated by the driven shaft for admitting and exhausting gases from the chambers at predetermined time intervals.

Another object of the invention is to provide an external combustion engine, as above characterized, in which a bellows compression chamber, operated by the up and down movement of the moving walls of the bellows expansion chambers of the engine, are provided to furnish compressed air to the combustion chamber.

Another object of the invention is to provide an external combustion engine, as characterized above, including an automatic control device for controlling the intake of fuel into the fuel supply conduit of the combustion chamber.

Other objects and advantages of the invention will appear in the following description when considered in connection with the accompanying drawings, wherein:

Fig. 1 is a diagrammatic view of one form of an engine unit of an external combustion engine constructed in accordance with the present invention;

Fig. 2 is a diagrammatic view of one form of the combustion unit of the engine of the present invention;

Fig. 3 is a horizontal sectional view, taken on the line 3—3 of Fig. 2;

Fig. 4 is a vertical cross-sectional end elevational view showing the details of the ash remover shown in Fig. 2;

Fig. 5 is a cross-sectional front elevational view, with parts broken away, of the fuel container and the details of the valve structure for regulating the fuel intake;

Fig. 6 is a diagrammatic vertical sectional front elevational view of one of the bellows driving chambers and bellows air compressor chamber of the engine unit shown in Fig. 1;

Fig. 7 is a diagrammatic vertical sectional side elevational view of the parts shown in Fig. 6; and Fig. 8 is a vertical sectional view showing the details of the inlet valve disclosed in Fig. 6.

Referring now to the drawings, there is shown one embodiment of an external combustion thermal engine constructed in accordance with the present invention and comprising an external combustion unit, indicated generally at 10; an automatic fuel control device, indicated generally at 11, for controlling the admission of fuel to the combustion chamber; an engine unit, indicated generally at 12, and composed of one or more driving expansion chamber units 13 (three such being shown), each of which includes an air compressor unit, indicated generally at 14.

In the particular embodiment of the invention illustrated, and, as shown in Fig. 2, the external combustion unit comprises spaced outer and inner concentric generally cylindrical, hollow, metal members 15, 16, having closed upper ends and with the bottom of the external member secured to the inner member adjacent its bottom end. The enclosed space 17 between the walls of the members forms a compressed air receiving space; a combustion space or chamber 18, defined by a generally cylindrical hollow member 19 concentrically mounted within the inner member 16; and an ash disposal unit, indicated generally at 20, formed as an integral part of the inner member 16.

The outer member 15 has an inlet conduit 21 connected thereto adjacent its upper end and through which compressed air is forced into the space 17 between the walls of the inner and outer members 15, 16. A fuel supply nozzle 22 extends through the control portion of the top wall of the outer container 15 and is connected to the fuel control device 11 by a fuel supply conduit 23.

The inner member 16 has an outlet conduit 24 connected thereto adjacent its upper end through which the gases of combustion pass to the bellows expansion chambers of the engine unit. The outlet conduit 24 is concentrically mounted within the inlet conduit 21 so that the incoming compressed air will be heated by the gases of combustion as they pass through the outlet conduit 24. A multiple injector 25 is mounted in the central portion of the top wall of the inner member 16 in position to create a suction in the nozzle 22.

The lower end portion of the inner member 16 extends through the bottom end of the outer member 15 and has an integral curved, open bottom extension 26 which forms a receptacle for receiving the ashes of combustion.

The hollow member 19, preferably made of refractory material, is concentrically mounted within the inner member 16 and is supported on circumferentially spaced lugs 27 secured to the inner wall of the inner member 15. The bottom end portion of the member 19 is frusto-conically shaped and is made of smaller diameter than the body of the member to provide a circular shoulder 28 which rests on the lugs 27. The upper end portion of the member 19 is frusto-conically shaped and is held in gas-tight engagement with the top wall of the inner member 16 with the inlet opening 29 in the member 18 in vertical alignment with the outlet opening in the multiple injector 25.

A horizontal partition wall 30 extends across the interior of the member 19 adjacent its lower end. A hollow, conically shaped member 31, also formed of refractory material, is formed integral with the wall 30 and extends upwardly into the interior of the member 19.

The conically shaped member 31 is of less diameter at its base than the internal diameter of the member 19 and is provided with a plurality of vertically spaced rows of circumferentially spaced upwardly and inwardly extending openings 32 communicating with the interior of the conical-shaped member 31.

The partition wall 30 is provided with a plurality of circumferentially spaced passageways 33 leading from the hollow interior of the member 31 to the open space 34 between the walls of the members 15 and 16, and is also provided with a plurality of circumferentially spaced passageways 35 leading from the space between the base of the conical member 31 and the side walls of the member 19 to the bottom opening in the bottom end of the member 19.

The fuel nozzle 22, as heretofore stated, extends through the central portion of the top wall of the outer member 15 and is positioned in vertical alignment with the vertical axis of the conical member 31. The multiple injector 25 is mounted between the top walls of the inner and outer members 15 and 16 and positioned to encircle the outlet end of the nozzle 22. The multiple injector 25 is made up of a plurality of curved passageways or injection elements 36 (see Fig. 3) with each injection element having its axis tangent to a circle having its center on the vertical axis of the member 19. The construction is such that the compressed air from the space 17 passing through the injector elements or passageways 36, will create a suction in the nozzle 22 and inject the air borne powdered fuel into the combustion chamber or space 18, where combustion takes place, and there is produced an eddying flame which, by centrifugation, causes a first decantation of the gases and frees them of part of the ashes in suspension. The ashes fall downwardly and pass through the passageways 35 and the open bottom end of the member 19 into the ash disposal unit receptacle 26.

The gases of combustion pass upwardly through the openings 32 into the hollow interior of the conical member 31 and through the passageways 33 into the open space 34 between the member 19 and the inner member 16. Then, the gases slowly move upward inside the enclosed space 34, due to the wide section offered them, and a second decantation is effected with the separated ashes falling down into the ash disposal unit receptacle 26.

The nozzle 22 is provided with a flap valve 37 positioned to prevent a return pressure in the conduit 23 in case the suction, due to the injector, should stop.

It is contemplated that the fuel be initially ignited due to the heat of compression of the compressed air delivered to the combustion chamber in a manner similar to that in a diesel engine. However, it can be ignited by any suitable and well known type of pilot lighter, such as are used in some diesel engines.

The primary air is delivered to the combustion chamber, along with the fuel, through the fuel supply conduit 23. The secondary air is delivered from the air pressure unit to the combustion chamber through compressed air conduit 21.

The ash disposal unit 20, the details of which are illustrated in Fig. 4, is formed in the lower end portion 26 of the inner member 16 which acts as a receptacle for the ashes. The portion 26 is made to curve, as shown in Fig. 4, with its extreme end portion extending vertically. An exteriorly threaded collar 38 is formed on the upper end of the vertical section and carries an internally threaded sleeve 39, which, in turn, carries a coiled compression spring 40. A lower sleeve 41 is engageable with the lower coils of the spring 40 and carries a valve 42 which is normally held in tight engagement with the periphery of the opening in the vertical portion of the extension 26. A stem 43 extends through a stem guide member 44 formed in the upper side wall of the extension 26 in vertical alignment with the opening in the bottom of the extension. The stem 43 carries a disc 45 on its lower end and has its upper end pivotally and slidably connected to a crank arm 46. The crank arm 46 is pivotally connected at one end to the extension 26 and at its other end is connected, through suitable levers (not shown) to a crank driven by the engine shaft to give the stem vertical up and down motion, so that, as the ashes accumulate in the vertical portion of the extension 26, they will be pressed downwardly against the pressure of the spring 40 and ejected through the opening in the bottom of the extension.

The details of construction of the fuel supply control unit 11 are shown in Fig. 5. As there shown, this unit comprises a fuel supply tank 47, which ends in its lower portion in a conically shaped spout 48 which extends through an opening 49 formed in the fuel supply pipe 23 adjacent its outer or free end; a convergent-divergent tuyère 50 slidably mounted in the supply pipe 23 adjacent its end; a valve stem guide 51 supported concentrically in the end of the supply pipe; a valve stem or rod 52 slidably mounted in the valve stem guide and connected at one end to the tuyère and at the other end to a flap valve 53; and an open-ended tubular cap member 54 secured to the open end of the fuel supply pipe 23 and having its outer peripheral edge curved inwardly to form a seat 55 for the valve 53.

The tuyère 50 is slidably mounted within the supply pipe 23 and is provided on its upper wall with a flat depression or land 56 on which the end of the spout 48 normally rests.

An opening 57 is formed in the upper wall of the tuyère adjacent to and in lateral alignment with the land 56. The opening or orifice 57 is preferably generally triangular-shape in outline and, when the tuyère is moved to the left, as viewed in Fig. 5, the orifice is brought into alignment with the spout 48, thereby permitting the solid fuel to flow into the supply pipe 23. The end of the spout 48 may be provided with a resilient ring or gasket 58 to seal the orifice when the spout is moved into vertical alignment therewith.

The valve stem guide 51 may be secured in the end of the supply pipe in any suitable manner, as by a spider 59. The valve stem or rod 52 is slidably mounted in the guide 51 with its inner end fixedly attached to the tuyère and its outer end fixedly attached to the valve 53. A coiled compression spring 60 is mounted on the rod 52 with its ends engaging the guide 51 and the valve 53 to normally maintain the valve pressed against its seat 55 formed in the cap member 54.

The supply tank 47 may be of any desired shape. However, it preferably is made cone-shaped, as shown in Fig. 5. A plurality of spaced small curved pipes 61 extend across the lower portion of the tank 47 and are connected at one end to a manifold 62 connected to the end of the exhaust pipe 63 to receive the exhaust gases from the engine unit. The other ends of the pipes 61 are connected to a manifold 64 which is connected to an evacuation conduit 65.

The operation of the device is believed obvious. Suction created in the fuel supply pipe 23 by the injector acts on the flap valve 53, causing it to move inwardly off its seat, permitting air to flow into the supply pipe and, at the same time, moving the tuyère to the left to bring the spout over the orifice in the tuyère, thereby permitting powdered fuel to be sucked into the supply pipe in an amount proportional to the air delivery, a proportion which is determined by the shape of the orifice.

The hot exhaust gases, arriving through the pipe 63 and passing through the pipes 61, heat and dry the fuel, if necessary, before it is sucked into the supply pipe 23.

In the particular embodiment of the invention illustrated, the engine unit 12 is shown in the form of a radial type engine composed of three driving expansion chamber units 13 arranged radially around and connected to drive a common drive shaft. The chambers are circumferentially spaced 120° apart and are mounted on a suitable frame. Each of the driving expansion chamber units 13 is identical in construction and, as shown in Figs. 6 and 7, each comprises a cylindrical expansion chamber 66 defined by a fixed bottom wall 67, a movable top wall 68, and a cylindrical bellows-type side wall 69. The cylindrical side wall is preferably made of a stack-up of annular metal pieces 70, welded by pairs, alternately by their inner and outer edges, and their elasticity allows a variation of the capacity of the chamber. The first and last pieces are secured on the circular top and bottom walls 68, 67, respectively. The lower bottom wall 67 is secured to the engine frame (not shown) in any suitable manner, and is provided with an intake valve 71 and an exhaust valve 72, which are operated by the drive shaft in a manner hereinafter to be explained.

The movable top circular wall 68 slides, under the action of the gas pressure, on two diametrically opposed pairs of slides 73, 74, by means of two shoes 75, 76 secured to the top member and adapted to slide up and down in the slides. A pair of connecting rods 77, 78, pivotally connected at their upper ends to trunnions 79, 80 carried by the top wall 68 and at their bottom ends to a rocker arm 81 pivotally connected to a crank 82, transmit the motion of the movable top wall to the driving shaft 83.

The exhaust valve 72 is controlled by a cam 84 keyed on the driving shaft 83. The valve stem 85 carries a cam follower on its end which rides on the cam 84. A coil spring 86 mounted on the valve stem normally keeps the valve closed. The exhaust gases are collected by the exhaust gas collector 87 which is connected to the exhaust gas pipe line 63.

The intake valve 71 is controlled by a cam 88 having a variable profile. The cam 88 is slidably keyed on the shaft 83 and is adjusted thereon by means of a fork 89 and a rod 90 to permit control of the speed of the engine by a variation of the admission of the gases. The intake valve is designed to permit positive opening of the valve against the pressure of the incoming gases and is closed by spring pressure. The details of construction of the intake valve are illustrated in Fig. 8. As there shown, the valve 71 is provided with a valve stem 91 which extends downwardly through a valve stem guide 92 carried by a circular closure member 93 threadedly secured in a circular opening formed in a flattened portion 94 of a chamber 95 which is connected to the gas delivery conduit 24. The bottom end of the valve stem 91 is connected to a hollow socket member 96 having a cylindrical side wall 97, an open bottom end, and a conically shaped top wall 98. The socket member 96 is slidably mounted in a second hollow socket member 99. The socket member 99 has a flat circular bottom wall 100 carrying a projection or cam follower 101 which rides on the cam 88 to give the socket member 99 an up and down motion in accordance with the varying circumferential outline of the cam. The top and bottom portions 102, 103 of the side wall of the socket member 99 are cylindrical and are connected by an intermediate portion 104 having an inverted frusto-conical shape. The socket member 96 is mounted in the socket member 99 with the cylindrical side wall 97 of the socket member 96 slidably engaging the cylindrical bottom portion 103 of the side wall of the socket member 99. A coiled compression spring 105 is mounted within the bottom portion of the socket member 99 with its bottom end engaging the bottom of the socket member 99 and its top end engaging an internal circular shoulder formed around the top of the cylindrical wall 97 of the socket member 96. The spring 105 is designed to normally hold the valve 71 tightly against its seat 106 formed in the fixed bottom wall of the bellows expansion chamber, when the socket member 99 is at its lowest point of downward movement permitted by the cam 88. A series of large balls 107 are freely mounted within the space between the upper portions of the two socket members 96 and 99, and, when the valve is closed with the socket member 99 at the lowermost point of its downward travel, the balls normally engage the lower portion of the conical top wall of the socket member 96 and the uppermost portion of the frusto-conically shaped portion of the side wall of the socket member 99, as shown in Fig. 8. The balls 107 are held in this positon by means of a plurality of small balls 108 carried by a ball race frame 109, the upper surface of which engages the under surface of a circular disc 110 slidably fitted within the upper cylindrical portion 102 of the side wall of the socket member 99. The disc 110 carries a centrally positioned internally threaded boss 111 which is threadedly secured on the lower end of the valve stem guide 92. The upper peripheral edge of the upper cylindrical portion 102 of the side wall of the socket member 99 has an internal annular flange 112 formed thereon, which extends over the circumferential edge of the disc 110, as shown in Fig. 8.

The operation of the device is as follows:

Any upward movement of the socket member 99 under the action of the cam 88 will cause a lowering of the socket member 96 by a length proportional to that by which the socket member 99 rises, due to the balls 107 rolling on the two conical surfaces of the two socket members. The small balls 108 roll on the large balls 107 and prevent any upward movement of the large balls. When the socket member 99 is lowered under the action of the cam, the spring 105 will force the socket member 96 upwardly correspondingly.

Each of the air compressor units 14 is identical in construction and, as shown in Figs. 6 and 7, each unit comprises upper and lower cylindrical compression chambers 113, 114 mounted in tandem on the movable top wall 68 of the expansion chamber 66. The upper compression chamber 113 is defined by a fixed top wall 115, a cylindrical bellows-type side wall 116, and a movable bottom wall 117 which is the portion of the movable top wall 68 enclosed by the cylindrical side wall 116.

The lower compression chamber 114 is defined by a cylindrical bellows-type wall 118, a movable top wall 119 which is the portion of the movable top wall 68 enclosed by the cylindrical side wall 118, and a fixed bottom wall 120 which is the portion of the fixed bottom wall 67 enclosed by the cylindrical side wall 118. The bellows-type side walls of the compression chambers are constructed similar to the bellows-type side wall of the expansion chamber 66, as hereinbefore described.

The fixed top wall 115 of the upper expansion chamber 113 is held stationary by means of support members 121 secured at their upper ends to the top wall 15 and at their lower ends to the top of the slides 73, 74.

The top wall 115 of the upper compression chamber is provided with an inwardly opening check valve 122. The top and bottom walls of the lower compression chamber are provided with check valves 123, 124, respectively. The ball valve 123 opens downwardly into the lower compression chamber and the valve 124 opens downwardly into a chamber 125 which is connected to the compressed air supply pipe line 21.

The operation of the device is believed obvious. As the movable top wall 68 of the expansion chamber 66 moves upwardly, the air in the upper compression chamber 113 will be compressed and forced into the smaller volume lower compression chamber 114, the check valve 123 opening for this purpose. As the movable top wall 68 moves downwardly, the check valve 123 is closed and the air in the lower compression chamber is compressed and forced into the chamber 125, the check valve 124 opening for this purpose, and, at the same time, fresh air will be sucked into the upper compression chamber, the check valve 122 opening for this purpose.

It should be noted, as shown in Figs. 6 and 7, that the bottom and top walls of the compression and expansion chambers are stamped out as required, so as to eliminate the dead spaces due to the stack-up height of the annular pieces which form the cylindrical side walls of these chambers.

From the foregoing description, it readily will be seen that there has been provided a novel and improved external combustion thermal engine having a combustion chamber adapted to burn powdered solid fuel and provided with novel means for supplying the fuel and ejecting the ashes of combustion, and also having an air compressor operated by the driving force of the engine unit to supply compressed air to the combustion chamber.

While the combustion chamber has been shown and described as adapted to burn powdered solid fuels, obviously, other types of fuel, such as liquids and gases, may be burned therein.

The arrangement of the component parts or units of the engine may be varied to meet the specific requirements for which the engine is designed.

Obviously, the invention is not restricted to the particular embodiment thereof herein illustrated and described.

What is claimed is:

1. A thermal engine comprising a combustion chamber having a fuel supply inlet, a compressed air inlet and an outlet for the gases of combustion; a rotatable shaft; a closed cylindrical bellows-type expansible and contractible driving chamber having a stationary end wall and a reciprocatable end wall; means cooperating with said reciprocatable end wall for rotating said shaft; said stationary end wall having an intake port and an exhaust port formed therein, said intake port communicating with a chamber connected to receive gases of combustion from said combustion chamber; an intake valve controlling said intake port; an exhaust valve controlling said exhaust port; means, including cams mounted on said shaft and rotatable therewith, for controlling said intake and exhaust valves to alternately admit and exhaust combustion gases from said driving chamber; a bellows-type cylinder concentrically mounted within said driving chamber with its ends secured to said fixed and reciprocatable walls to form an expansible and contractible air compression chamber said reciprocatable end wall having a valved intake port formed therein for admitting air into said compression chamber; and said fixed end wall having a valved outlet port formed therein and communicating with a compressed air conduit for delivering air compressed in said compression chamber to said compressed air inlet, the construction and arrangement being such that, as the gases of combustion are alternately admitted and discharged from said driving chamber, said reciprocatable end wall will be actuated to rotate the engine shaft and simultaneously compress air and supply it to said combustion chamber.

2. A thermal engine, as set forth in claim 1, wherein the means for controlling the intake valve includes a variable profile cam slidably mounted on said shaft and a fork connected to said variable profile cam to move it longitudinally of the shaft to vary the speed of the engine.

3. A thermal engine, as set forth in claim 1, wherein said intake valve comprises a hollow cam follower member having a closed bottom and resting upon said variable profile cam and having an upwardly and outwardly inclined surface adjacent its upper end, a valve disc engaging said intake port and having a stem provided with an enlarged bottom end slidably mounted within said cam follower. said enlarged end having an upwardly and inwardly inclined surface, a plurality of balls positioned between the inclined surfaces of said follower and the bottom end of the valve stem; a retaining member mounted within said follower for preventing upward movement of said balls; whereby upward movement of said follower will cause the valve disc to be moved downward, thereby opening the intake port; and spring means for normally holding said valve disc closed.

4. A thermal engine, as set forth in claim 1, wherein the side walls of the driving chamber and air compression chamber are made of a stack-up of annular metal plates welded by pairs, alternately by their inner and outer edges, with the free edges of the top and bottom plates welded respectively to the reciprocatable and fixed walls of the chambers.

5. A thermal engine, as set forth in claim 1, wherein the fuel supply inlet is in the form of a nozzle which is connected to a source of fuel and air and wherein a multiple air injector is mounted in said combustion chamber surrounding the outlet end of said nozzle and communicating with said compressed air inlet so that the compressed air admitted to the chamber will create a suction in said nozzle to deliver fuel and primary air therefrom.

6. In an external combustion engine, a combustion chamber comprising a generally vertical, elongated, hollow metal member having top, bottom and side walls, said member being provided with an inlet opening in its top wall, an exit opening in its bottom wall for the passage of the ashes of combustion, and an outlet opening in its bottom wall for the passage of the gases of combustion; an elongated, hollow refractory member having bottom and side walls and an inlet opening in its upper end and an exit opening in its bottom wall for the passage of the ashes of combustion, said refractory member being mounted within said metal member with their side walls spaced apart and with their inlet openings in vertcal alignment with the wall portions of the members forming the peripheries of their respective inlet openings in engagement, said refractory member being provided with an outlet opening in one of its walls communicating with the space between the side walls of the metal refractory members for the passage of the gases of combustion; means including a fuel supply conduit communicating with said aligned inlet openings for supplying powdered fuel and air to the interior of said refractory member in which combustion takes place; and a hollow conically-shaped decanting member mounted within said refractory member with its base engaging the bottom wall thereof and its hollow interior in communication with the outlet opening in the bottom wall of the refractory member for the passage of the gases of combustion; said conically-shaped member having a plurality of circumferentially and vertically spaced upwardly inclined openings extending through its side wall to cause a decanting of the gases of combustion.

7. A combustion chamber, as set forth in claim 6, including a control valve mounted in the fuel supply conduit for admitting primary air thereinto, said valve being connected to a tuyère mounted in said fuel supply conduit and having a port adapted to be brought into communication with the source of fuel supply in response to the opening movement of said control valve; and a spring normally holding said control valve in closed position, said control valve being moved in response to variations in suction in the fuel supply conduit created by changes in the speed of the engine.

8. A combustion chamber, as set forth in claim 7, wherein an ash receiver is formed in the lower portion of said metal member in position to receive the ashes from said ash passageways, said ash receiver having an opening in its lower end, a closure member for said opening, spring means for normally holding said closure member in closed position, and ejector mechanism for forcing ashes through said opening, said ejector mechanism being provided with actuating means connected to be automatically operated by said engine.

References Cited in the file of this patent

UNITED STATES PATENTS

| Number | Name | Date |
|---|---|---|
| 99,793 | Smith | Feb. 15, 1870 |
| 542,543 | Thomas | July 9, 1895 |
| 590,863 | Severy | Sept. 28, 1897 |
| 730,782 | Morrison | June 9, 1903 |
| 862,867 | Eggleston | Aug. 6, 1907 |
| 985,793 | Fabel | Mar. 7, 1911 |
| 1,079,151 | Smallwood | Nov. 18, 1913 |
| 1,180,947 | Scott | Apr. 25, 1916 |
| 1,328,160 | Lawn | Jan. 13, 1920 |
| 1,342,135 | Schmidt | June 1, 1920 |
| 1,393,831 | Rossman | Oct. 18, 1921 |
| 1,444,421 | Kinyon | Feb. 6, 1923 |
| 1,694,393 | Nagh et al. | Dec. 11, 1928 |
| 1,810,768 | Holzwarth | June 16, 1931 |
| 1,831,976 | Stow | Nov. 17, 1931 |
| 2,131,216 | Brooke | Sept. 27, 1938 |
| 2,355,924 | Pateras Pescara | Aug. 15, 1944 |
| 2,404,395 | Milliken | July 23, 1946 |
| 2,449,262 | Weigel | Sept. 14, 1948 |
| 2,459,447 | Milliken | Jan. 18, 1949 |
| 2,510,240 | Mayo | June 6, 1950 |
| 2,616,252 | Robinson et al. | Nov. 4, 1952 |